US005764990A

United States Patent [19]
Sullivan

[11] Patent Number: 5,764,990
[45] Date of Patent: Jun. 9, 1998

[54] COMPACT ENCODING FOR STORING INTEGER MULTIPLICATION SEQUENCES

[75] Inventor: Brian Sullivan, San Francisco, Calif.

[73] Assignee: Hewlett-Packard Company, Palo Alto, Calif.

[21] Appl. No.: 618,276

[22] Filed: Mar. 18, 1996

[51] Int. Cl.⁶ ........................................ G06F 9/45
[52] U.S. Cl. .................. 395/705; 395/701; 395/709; 395/710; 395/389; 395/384; 395/587; 395/562; 364/280.4; 364/280.5; 364/745.01; 364/736.01; 364/258.2; 364/262.4
[58] Field of Search .................... 395/705–710, 395/701, 561, 562, 587, 595, 389, 384; 364/280.4, 280.5, 280.1, 280, 262.4, 263.3, 754.01, 754.02, 736.01–736.03, 716.05, 716.03, 716.07, 258, 258.2, 259, 265.4

[56] References Cited

U.S. PATENT DOCUMENTS

| 5,170,475 | 12/1992 | Wright et al. | 395/564 |
| 5,184,317 | 2/1993 | Pickett | 364/735 |
| 5,337,415 | 8/1994 | DeLano et al. | 395/389 |
| 5,687,360 | 11/1997 | Chang | 395/587 |

OTHER PUBLICATIONS

Granlund, "Division by Invariant Integers using Multiplication", SIGPLAN 94–6/94.

Bernstein, "Multiplication by Integer Constants", Software—Practice and Experience, vol. 16(7).

*Primary Examiner*—Emanuel Todd Voeltz
*Assistant Examiner*—Tuan Q. Dam

[57] ABSTRACT

An efficient sequence of ALU instructions that performs multiplication by a constant is readily generated by using a simple lookup table to determine the most efficient sequence of ALU instructions for a given integer X during compile time.

20 Claims, 7 Drawing Sheets

COMPACT ENCODING FOR STORING INTEGER MULTIPLICATION SEQUENCES

BACKGROUND OF THE INVENTION

TECHNICAL FIELD

The invention relates to computers. More particularly, the invention relates to performing computer implemented multiply operations during source code compilation.

DESCRIPTION OF THE PRIOR ART

Integer multiplication by a known constant X is often implemented on processors that do not have a hardware instruction for integer multiplication by using short sequences of arithmetic and logical unit ("ALU") instructions. Prior solutions involve using a search algorithm that searches for these sequences during the compile stage. Because the search algorithm is very complex, various heuristics are used to help the compiler narrow the search. Unfortunately, these heuristics often cause the compiler to use a less efficient sequence of ALU instructions to implement the multiplication. Thus, the executable produced by the compiler operates in a less than optimal manner.

Additionally, for certain integer constants the compile time search algorithm cannot find a legal sequence of ALU instructions to implement the multiplication. In such cases, the multiplication sequence must be performed using a runtime subroutine. Such use of subroutines during runtime seriously impairs application performance.

Various techniques have been proposed for performing integer multiply and divide operations. For example, T. Granlund, P. Montgomery, *Division By Invariant Integers using Multiplication*, Association of Computing Machinery, 0-89791-662-x/94/0006 (1994) discloses an algorithm for accomplishing integer division that presents code sequences for division as arbitrary nonzero integer constants and run-time invariants that use integer multiplication. The algorithm assumes a two's complement architecture which requires that the upper half of an integer product be quickly accessible.

R. Bernstein, *Multiplication by Integer Constants*, Software—Practice and Experience, vol. 16(7), pp. 641–652, John Wiley & Sons, Ltd. (1986) discloses a method for finding a sequence of 'add', 'subtract', and 'shift' to multiply the contents of a register by an integer constant. Bernstein discusses a method proposed by Knuth (cited in Bernstein) for constructing a table of small star-chain sequences for all numbers up to some desired limit. Bernstein concludes that the space required to store such a table would be enormous, that the method proposed by Knuth is sensitive to instruction-set timings, and that the table constructed using such method is specific to the instruction set of the target machine. Thus, the art presently discourages the use of a table as part of an integer multiply operation.

It would be desirable to provide a technique that solves the problem of generating an efficient sequence of ALU instructions for performing such integer multiply operations.

SUMMARY OF THE INVENTION

The invention solves the problem of generating an efficient sequence of ALU instructions that perform such integer operations as multiplication by a constant. Thus, integer multiplication by a known constant X is implemented using a lookup table that contains the most efficient sequence of instructions for the target architecture. The invention provides a compact encoding that can be used to store short sequences of ALU instructions. For the PA-RISC architecture (Hewlett-Packard Company, Palo Alto, Calif.), such compact encoding can store sequences of up to eight ALU instructions in less than 64-bits.

In practice, the invention constructs a lookup table, such that the most efficient sequence of ALU instructions that is necessary to perform an integer multiplication by a known constant can always be generated by the compiler. In the preferred embodiment of the invention, the known constant operand is used as an index into the lookup table to retrieve a 64-bit integer. This 64-bit integer is then expanded into a short sequence of ALU instructions that performs an integer multiplication by X. Although it is computationally very expensive to compute the most efficient sequence of ALU instructions for any particular integer X, the values in the lookup table are precomputed solutions that need be determined only once for a particular architecture.

DETAILED DESCRIPTION OF THE INVENTION

The invention solves the problem of generating the most efficient sequence of ALU instructions for performing such integer operations as multiplication by a constant. The invention provides a simple lookup table during compile time that is used to determine the most efficient sequence of ALU instructions for a given integer X.

Figure 1:
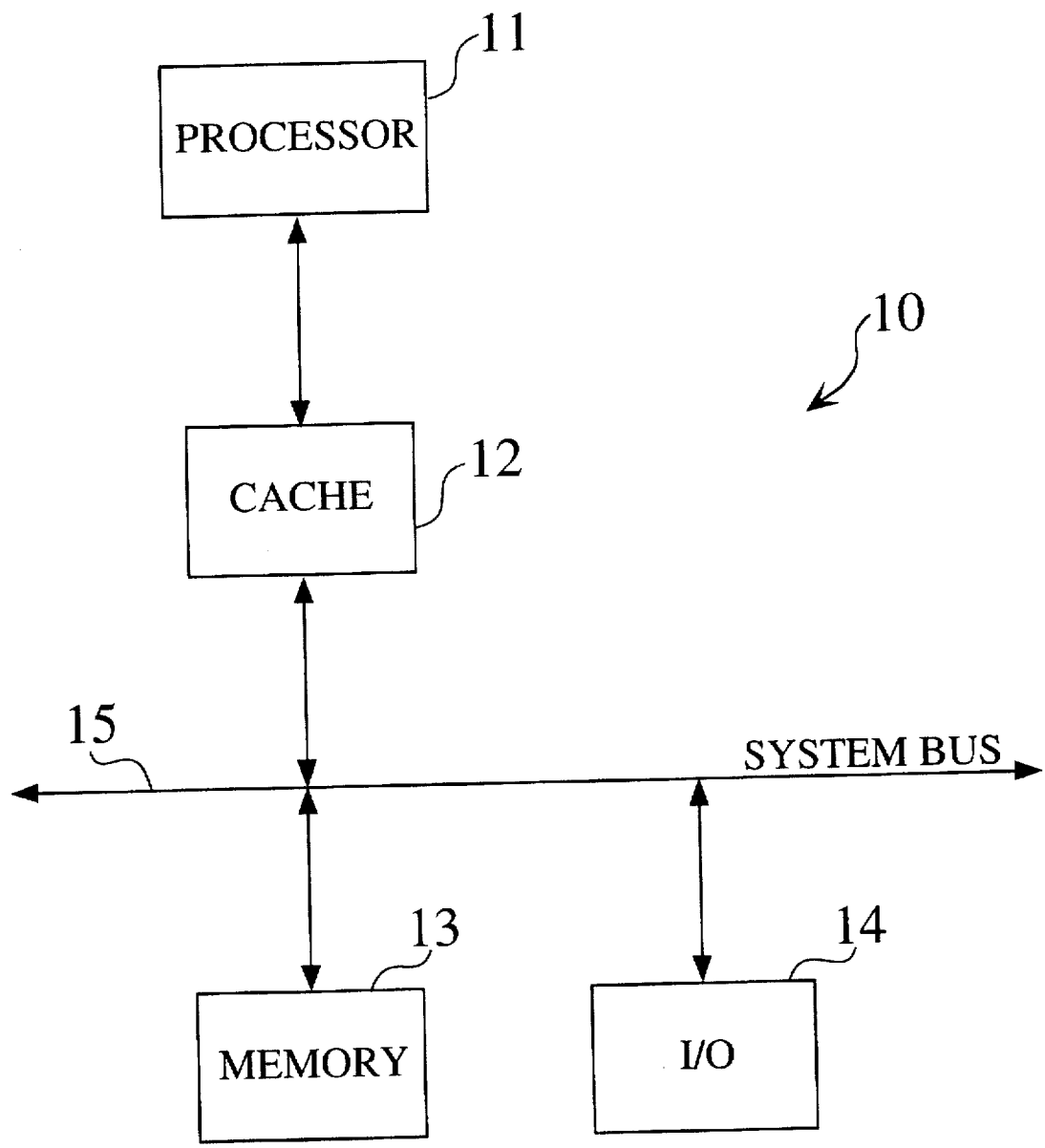
FIG. 1 is a block schematic diagram of a uniprocessor computer architecture.

FIG. 1 is a block schematic diagram of a uniprocessor computer architecture 10. In the figure, a processor 11 includes a cache 12 which is in communication with a system bus 15. A system memory 13 and one or more I/O devices 14 are also in communication with the system bus.

In a compile operation, a user submits a source code program to a compiler, which is a program that runs on the computer. The compiler accepts the source code, processes the code, and produces an executable file that is optimized for a target computer architecture, e.g. computer architecture 10.

Figure 2:
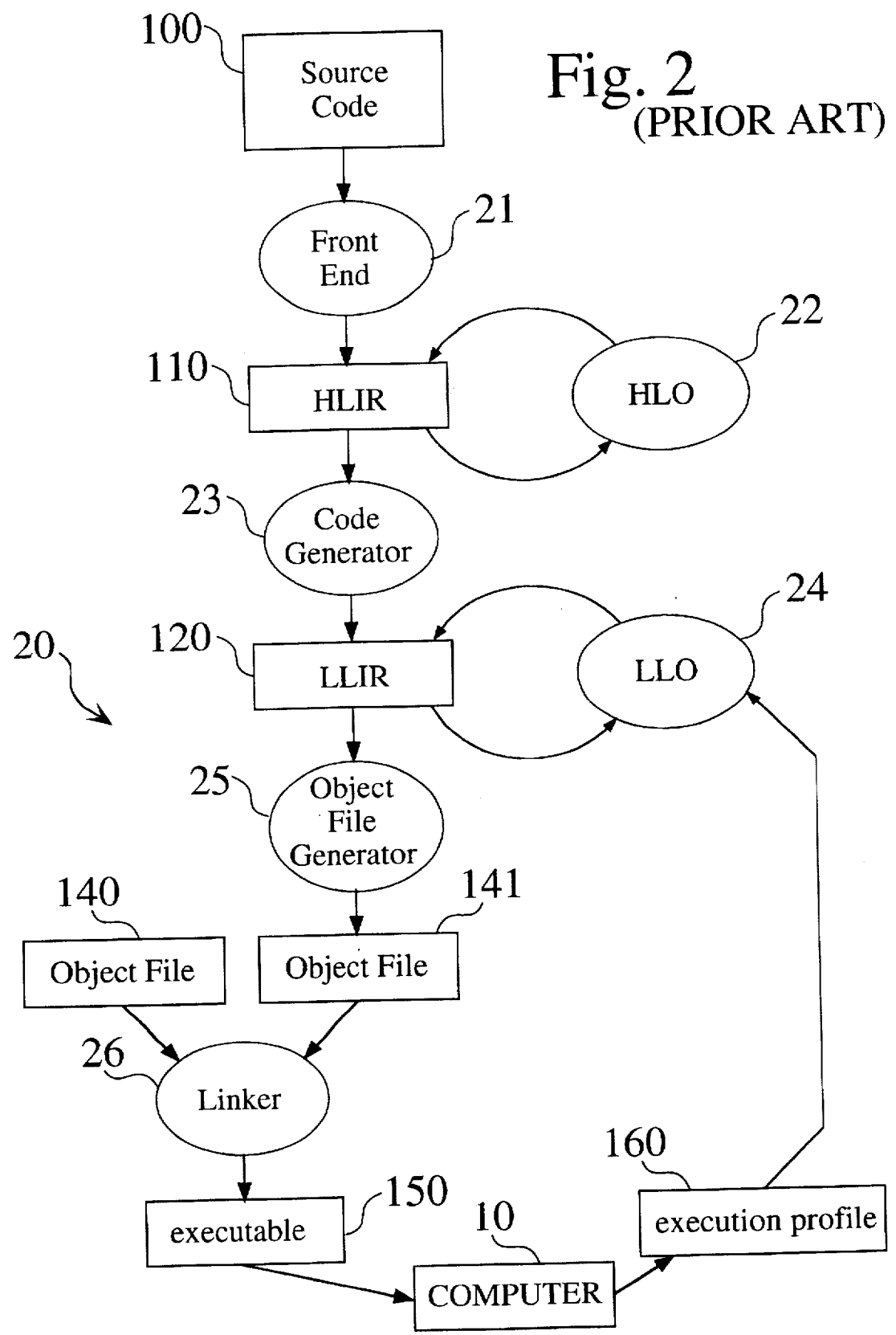
FIG. 2 is a block schematic diagram of a software compiler, for example as may be used in connection with the computer architecture shown in FIG. 1.

FIG. 2 is a block schematic diagram of a software compiler 20, for example as may be used in connection with the computer architecture 10 shown in FIG. 1. The compiler front end component 21 reads a source code file (100) and translates it into a high level intermediate representation (110). A high level optimizer 22 optimizes the high level intermediate representation 110 into a more efficient form. A code generator 23 translates the optimized high level intermediate representation to a low level intermediate representation (120). The low level optimizer 24 converts the low level intermediate representation (120) into a more efficient (machine-executable) form. Finally, an object file generator 25 writes out the optimized low-level intermediate representation into an object files (141). The object file (141) is processed along with other object files (140) by a linker 26 to produce an executable file (150), which can be run on the computer 10.

In a modern computer architecture, the compiler performs many tasks. For example, the compiler translates a high level language, such as C, into a series of machine instructions. One of the tasks performed by a compiler is to process a high level expression that involves an integer operation such as multiplication.

Multiplication operations are very common. For example, there may be an expression that includes a multiplication operation, such as 59×V, where V is a variable. In such case, the compiler must determine how to do perform such multiplication operation. Known compilers use a heuristic to determine how to synthesize shift and add instructions, such that 59 would be the output. Thus, one input V would be provided to a sequence of instructions, and the output of the final instruction would be V times 59.

As discussed above, one run-time algorithm used by compilers is a search algorithm that searches using a heuristic. Instead of performing a search, the invention uses the input value, e.g. 59, as an index into a table, for example the 59th element in the table, extracts an integer, performs a sequence of predetermined operations on the integer, thereby breaking the integer into several smaller integers. Each of these smaller integers is then mapped into an instruction, e.g. add, shift, subtract. The sentinel is used to indicate that the process should stop. The result of the last instruction that the compiler generates before encountering the sentinel is the desired result, i.e. V×59. However, in some embodiments of the invention, the receipt of a predetermined maximum number of instructions indicates that the process is complete. In such case, the sentinel instruction is not required.

Because the one time cost for searching to find an integer operation sequence can be a computationally expensive exponential algorithm, the table herein is constructed using an off-line process that precomputes all of the solutions for each integer. The table stores the shortest, most optimal sequence of instructions for the target architecture as a single integer. This single integer can then be unpacked by the compiler to extract the optimal sequence of instructions for the particular integer.

Because each sequence can be compressed essentially into an integer, the storage requirements for the table are minimal. In the preferred embodiment of the invention, where solutions are provided for all the integers $-2^{16}$ (e.g. $-65.536$) to $+2^{16}-1$ (e.g. 65,535), it is only necessary to index the table, extract the stored integer, decompose the integer into a sequence of up to eight instructions, and input a value to perform an integer multiplication operation by a particular known constant. It is possible to make the table larger or smaller. While a 64-bit integer is useful because it is a natural size for the PA-RISC architecture, there is no limitation, e.g. it is possible to use a 120-bit or other size integer.

The invention precomputes a sequence for a certain given integer. For example, if it is desired to multiply by 5, then using SHIFT 2 and ADD, the original source operand is shifted by 2, which is multiplication by 4, and added the original source operand, which yields 4 plus 1, or a multiply by 5. Likewise, a SHIFT 3 and ADD would multiply by 9; and a SHIFT 1 and ADD would multiply by 3.

All of the instructions necessary to perform the foregoing integer operations would typically be too large to store with the run time code as a look-up table. If there are eight instructions, where each instruction can take various operands, either the original source operand or any of the temporaries that are produced along the path, it would be difficult to provide a look-up table. The mapping between a number and eight instructions would normally be difficult and would require a huge amount of storage space. One advantage of the invention is that the table is associated with the compiler. Accordingly, little time is spent at compile time to determine an optimal way of performing a particular multiplication operation. This can improve the compilation speed of the compiler.

Furthermore, the process that generates the look-up table can run off-line for as long as is necessary to generate entirely optimal sequences for every single integer. In contrast, known compilers use a heuristic to try to determine how to multiply by a particular integer, and may come up with a sequence. However, such sequence may not be the best sequence because there are hundreds of sequences that could perform the multiply operation. By providing a look-up table, the invention minimizes the height of the tree of instructions that are generated so that several instructions for certain architectures can be issued in parallel. Thus, if there are two or more ALUs it is possible create a table that is ideal for a particular architecture, i.e. a sequence that can issue two or more instructions at once, such that the multiple ALUs execute in parallel, and then later on it can combine the final result.

The invention is preferably associated with the low level optimizer in the compiler because multiplication is an elementary operation for the compiler to perform. The table may be an auxiliary file that the compiler can read from the hard disk as needed to provide a subroutine on how to multiply by a particular integer. The table could also be stored in the cache if it is accessed frequently.

Figure 3A:
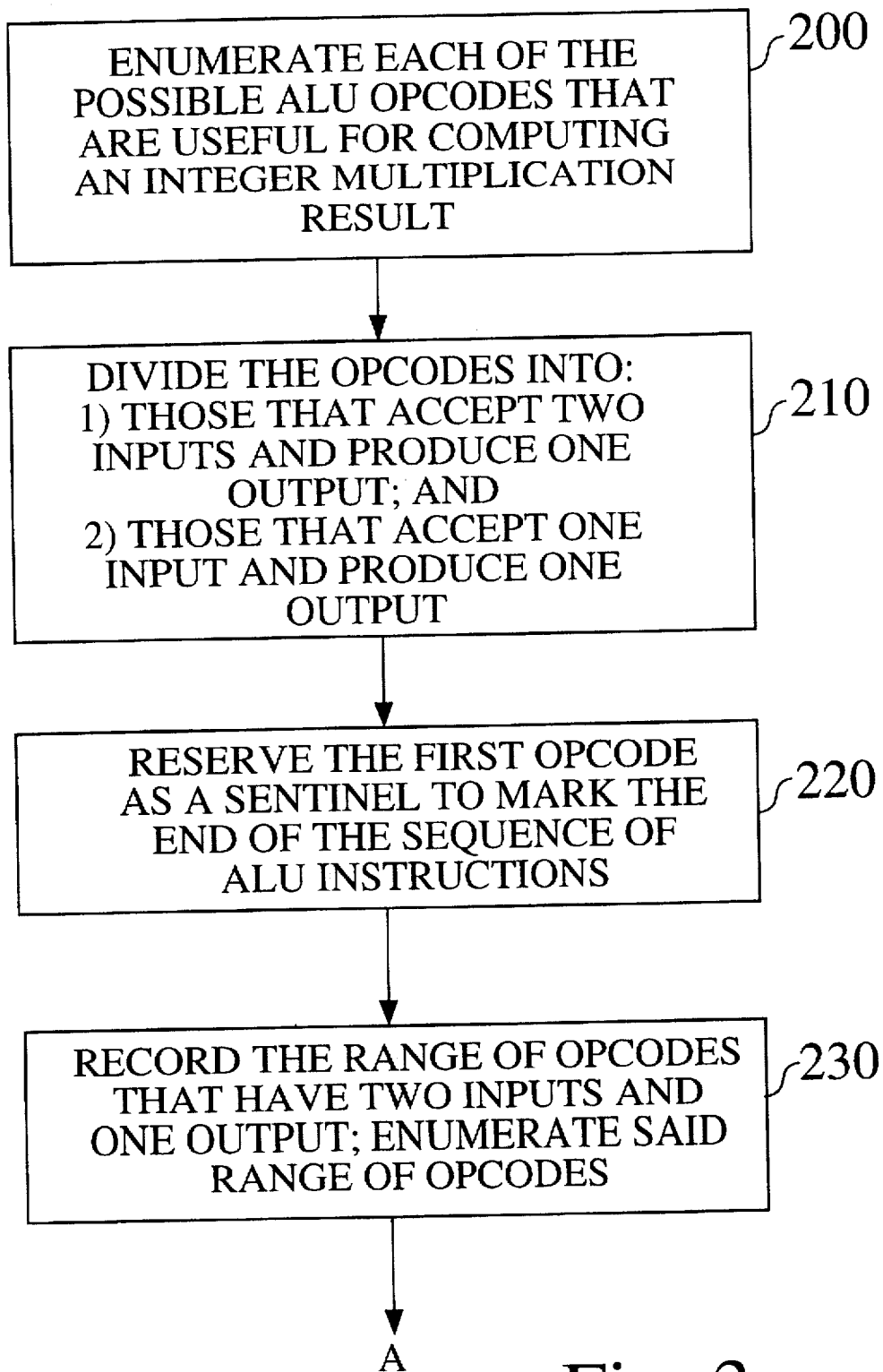
FIGS. 3a and 3b are a block diagram of a compilation system that implements a compact encoding scheme for storing integer multiplication or division sequences according to the invention.
Figure 3B:
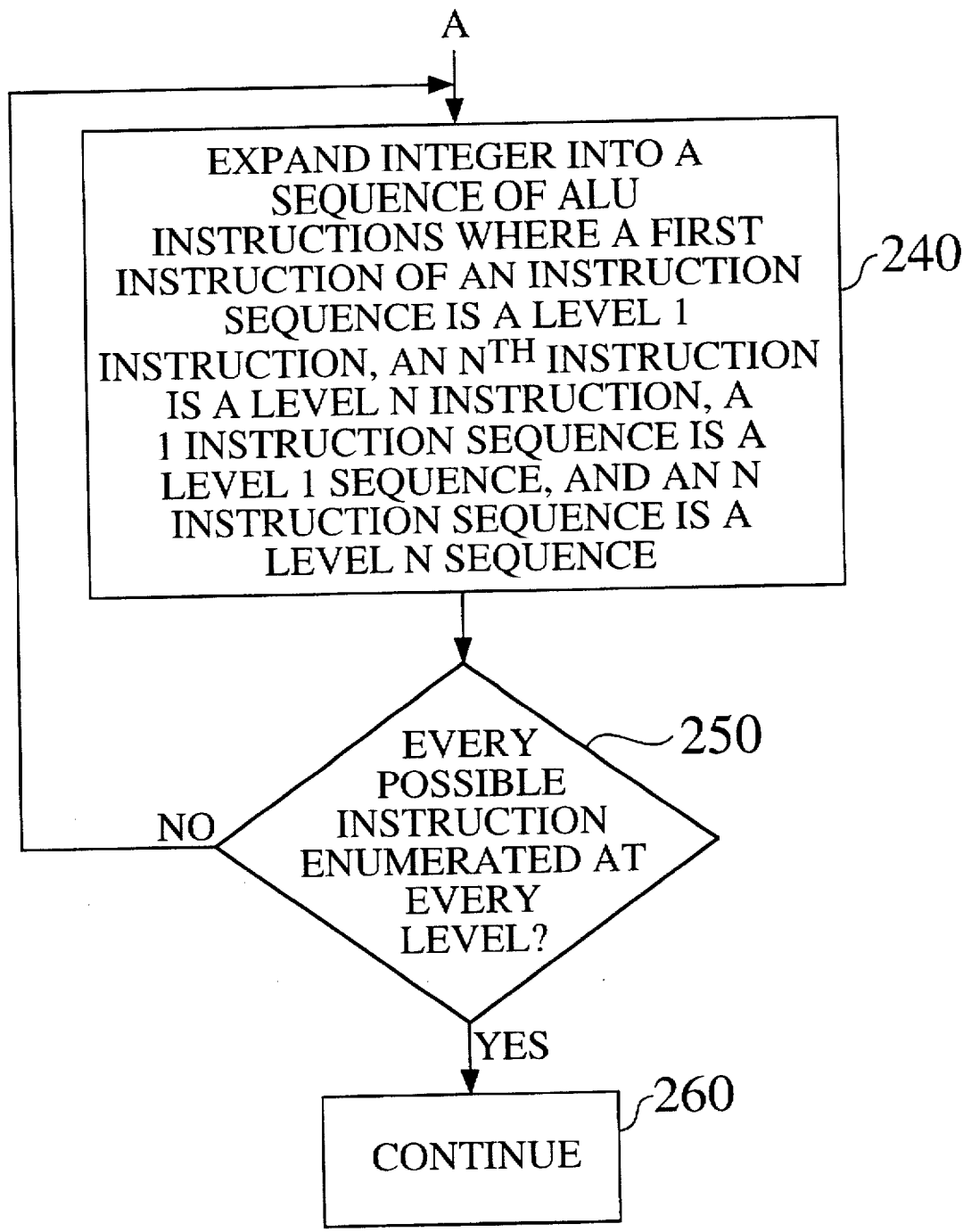

FIGS. 3a and 3b are a block diagram of a compilation system that implements a compact encoding scheme for storing integer multiplication or division sequences according to the invention. The compact encoding scheme herein disclosed operates as follows:

Each of the possible ALU opcodes that are useful on a given architecture for computing an integer multiplication result are enumerated (200). For the PA-RISC architecture (Hewlett-Packard Company, Palo Alto, Calif.) these opcodes are:

add, sub, sh1add, sh2add, sh3add, neg[1], and sh1[2].

Notes:

1. The neg opcode is implemented using a subtract from rO, which for the PA-RISC architecture is hardwired to zero.

2. For the PA-RISC architecture, the shl opcode actually uses a special form of the extr opcode.

The above opcodes are divided into three operand opcodes and two operand opcodes (210). Three operand opcodes are those that accept two inputs and produce one output, e.g. add, sub, sh1add, sh2add, sh3add; and two operand opcodes are those that accept one input and produce one output, e.g. neg. The shift-left opcode shl is a three operand opcode that has a general purpose register input, a constant integer input, and that produces an output. However, for purposes of the invention, the shl opcode is treated as 31 different two operand opcodes with the constant integer input, i.e. 1 to 31, folded into the opcode, i.e.:

shl1, shl2, shl3, shl4, . . . , shl30, shl31.

Additionally, the first opcode is reserved (220) as a sentinel to mark the end of the sequence of ALU instructions:

nop.

For a PA-RISC implementation of the invention (the presently preferred embodiment of the invention), the following ALU opcodes, and their enumerated values, are provided:

| nop = | 0, | shl7 = | 13, | shl20 = | 26, |
|---|---|---|---|---|---|
| sh3add = | 1, | shl8 = | 14, | shl21 = | 27, |
| sh2add = | 2, | shl9 = | 15, | shl22 = | 28, |
| sh1add = | 3, | shl10 = | 16, | shl23 = | 29, |
| sub = | 4, | shl11 = | 17, | shl24 = | 30, |
| add = | 5, | shl12 = | 18, | shl25 = | 31, |
| neg = | 6, | shl13 = | 19, | shl26 = | 32, |
| shl1 = | 7, | shl14 = | 20, | shl27 = | 33, |
| shl2 = | 8, | shl15 = | 21, | shl28 = | 34, |
| shl3 = | 9, | shl16 = | 22, | shl29 = | 35, |
| shl4 = | 10, | shl17 = | 23, | shl30 = | 36, |
| shl5 = | 11, | shl18 = | 24, | shl31 = | 37. |
| shl6 = | 12, | shl19 = | 25, | | |

Next, the range of opcodes that have two inputs and one output is recorded (230). The remaining opcodes have one input and one output, except for the sentinel opcode which has no inputs or outputs and instead is used to mark the end of the sequence of ALU instructions. For the PA-RISC implementation of the invention, the range of opcodes that have two inputs and one output are the opcodes that are enumerated 1 (shl add) to 5 (add).

For a sequence of ALU instructions, the first instruction of a sequence is referred to as a level 1 instruction and the eighth instruction in a sequence is referred to as a level 8 instruction. Likewise, all one instruction sequences are called level 1 sequences and all eight instruction sequences are called level 8 sequences.

For a level 1 instruction there is only one possible input, i.e. the unknown value that is used in the multiplication operation. This unknown value is referred to as U. Thus, as an expansion of a 64-bit integer into a sequence of ALU instructions is performed (240), a single input value U is available for use in forming an instruction. As the ALU instructions are expanded, one additional input is available for each level that has been expanded. The result of the level 1 instruction is referred to as L1. Likewise, the result of the level 2 instruction is referred to as L2.

The compact encoding relies upon the property that it is possible to enumerate every possible instruction at every level (250). For a level 1 add instruction there is only one encoding available:

add U,U,L1

For the PA-RISC implementation, at level 1 there are 38 unique encodings, one for the sentinel and one for each opcode.

At the next level, it is possible to use either the original unknown value U as a input or the newly computed result from the level 1 instruction. Thus, for two input opcodes, such as add, there are now 2×2 or 4 possible encodings that use the add instruction. It is not necessary to take advantage of the fact that the add instruction is commutative when enumerating the different encodings at each level.

For a level 2 add instruction there are four different encodings available:

add U,U,L2
add U,L1,L2
add L1,U,L2; and
add L1,L1,L2.

For the PA-RISC implementation of the invention, at level 2 there are 85 unique encodings. These encodings can be computed by taking the square of the level ($2^2=4$) and multiplying this value by the number of opcodes that have two inputs (5×4=20), e.g. in the PA-RISC implementation of the invention there are 20 possible instructions. The number of instructions that have one input is added to this value. Thus, there are (37−5=32) opcodes each with two possible inputs, (32×2 =64) or 64 possible one input instructions. One is added to the total for the end of sequence sentinel.

The following is a table that shows the number of unique encodings for each level:

| Level | two input instructions | one input instructions | sentinel instruction | number of unique encodings at this level |
|---|---|---|---|---|
| 1 | $1^2 \times 5 = 5$ | $1 \times 32 = 32$ | 1 | 5 + 32 + 1 = 38 |
| 2 | $2^2 \times 5 = 20$ | $2 \times 32 = 64$ | 1 | 20 + 64 + 1 = 85 |
| 3 | $3^2 \times 5 = 45$ | $3 \times 32 = 96$ | 1 | 45 + 96 + 1 = 142 |
| 4 | $4^2 \times 5 = 80$ | $4 \times 32 = 128$ | 1 | 80 + 128 + 1 = 209 |
| 5 | $5^2 \times 5 = 125$ | $5 \times 32 = 160$ | 1 | 125 + 160 + 1 = 286 |
| 6 | $6^2 \times 5 = 180$ | $6 \times 32 = 192$ | 1 | 180 + 192 + 1 = 373 |
| 7 | $7^2 \times 5 = 245$ | $7 \times 32 = 224$ | 1 | 245 + 224 + 1 = 470 |
| 8 | $8^2 \times 5 = 320$ | $8 \times 32 = 256$ | 1 | 320 + 256 + 1 = 577 |

Once all of the possible encodings are known (260), the integer can be reduced into a sequence of ALU instructions.

Figure 4A:
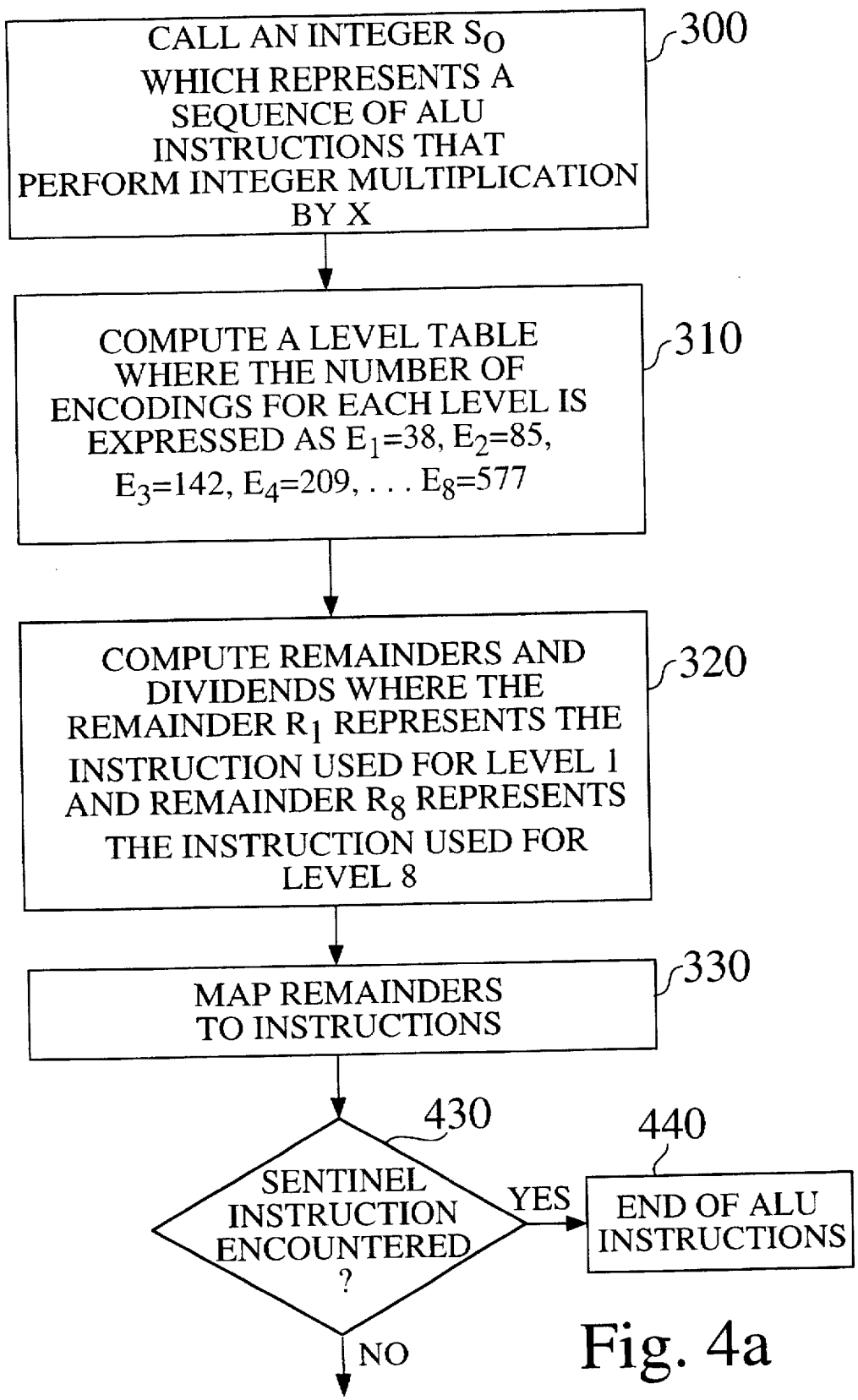
FIGS. 4a, 4b, and 4c a block diagram of an algorithm for reducing an integer into a sequence of ALU instructions according to the invention.
Figure 4B:
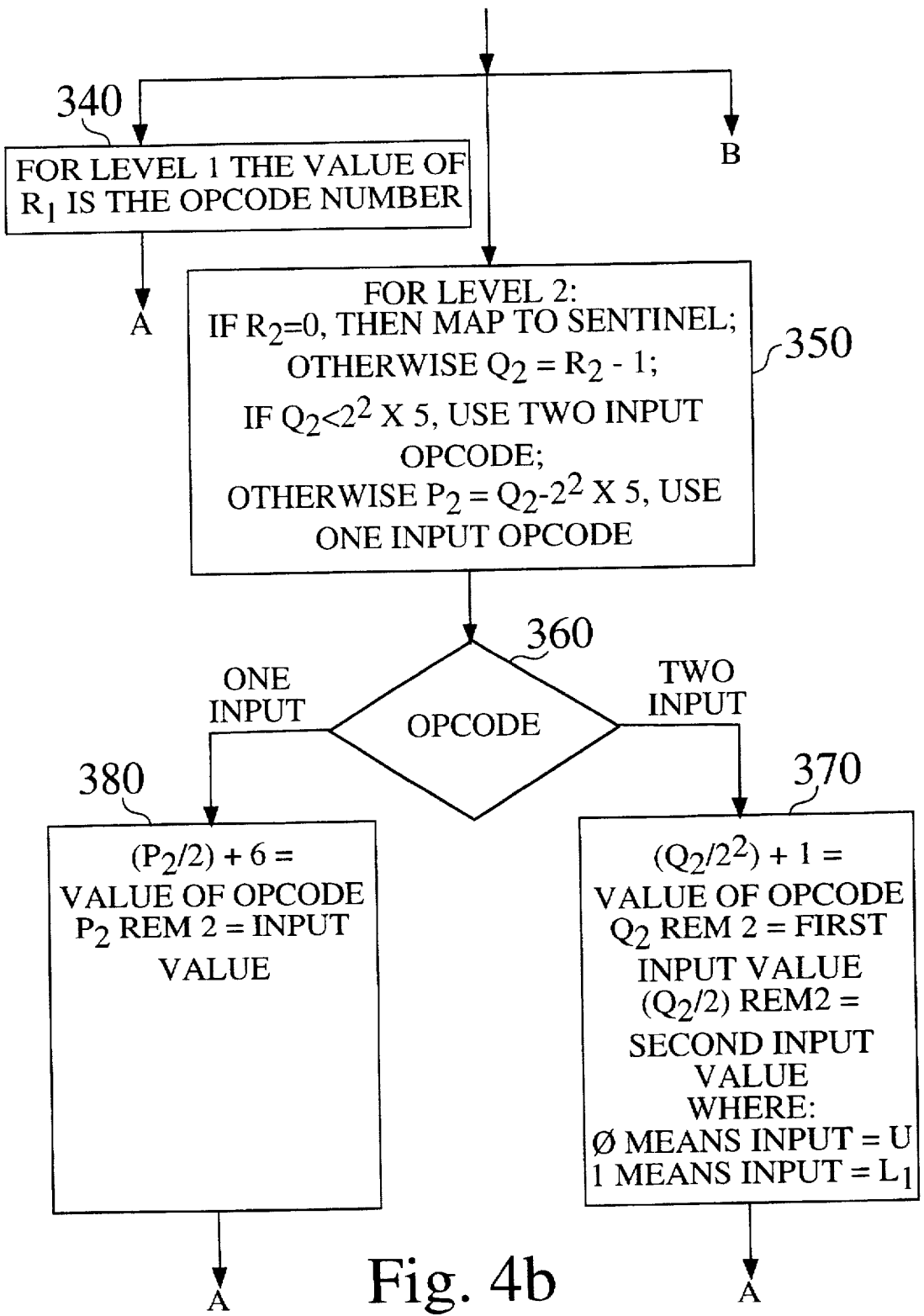
Figure 4C:
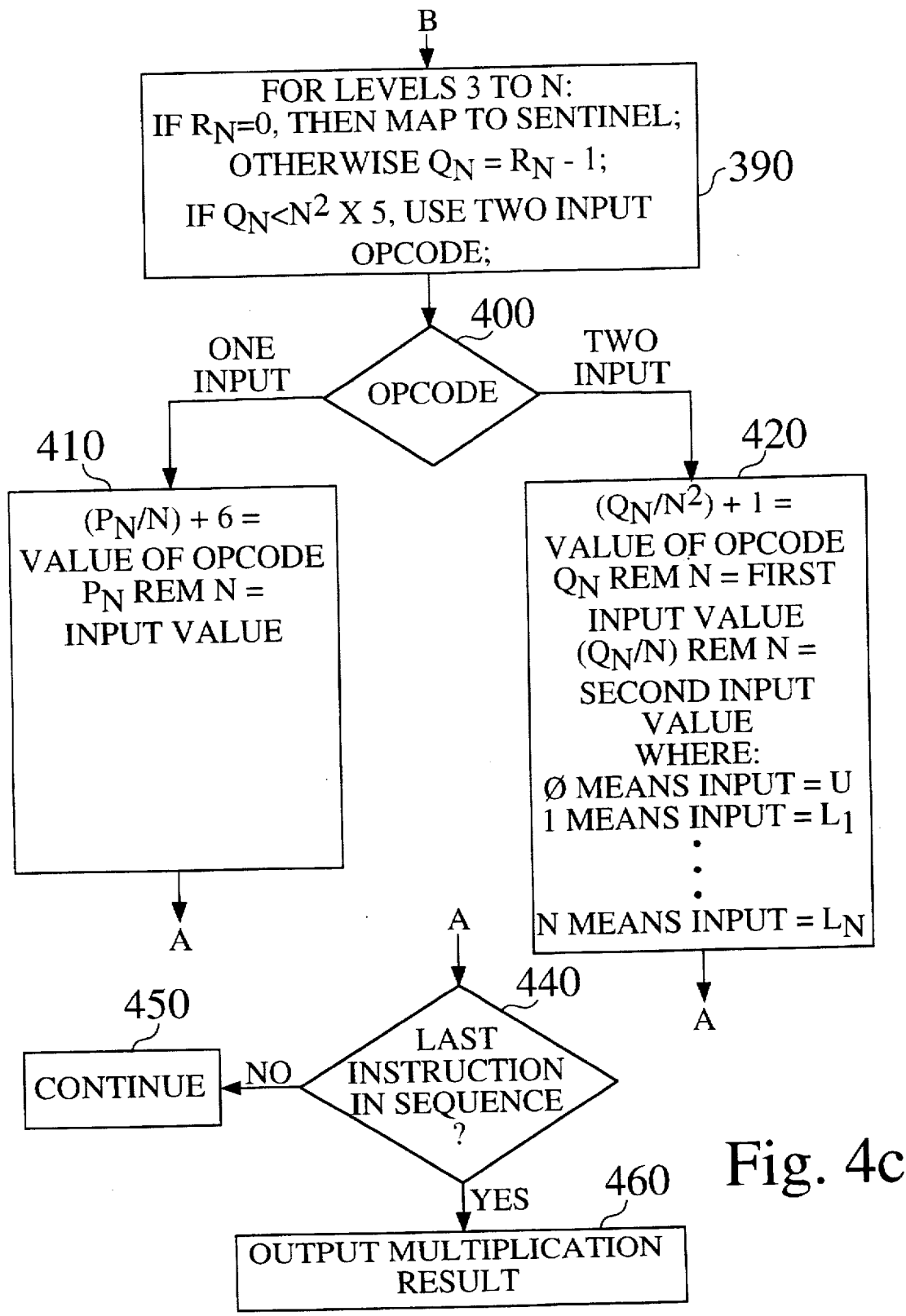

FIGS. 4a, 4b, and 4c are a block diagram of an algorithm for reducing an integer into a sequence of ALU instructions according to the invention. The algorithm for reducing a 64-bit integer into a sequence of up to eight ALU instructions is as follows:

Call the original 64-bit integer $S_0$ which represents the sequence of ALU instructions that performs integer multiplication by × (300).

Compute the level table as shown above in connection with FIG. 3 (310). The values for encodings at each level in the above level table are referred to as follows: $E_1=38$, $E_2=85$, $E_3=142$, $E_4=209$, ... $E_8=577$. The number of bits required to store eight instructions can be computed, based on the following:

ceiling ($\log_2 (E_1 \times E_2 \ldots \times E_8)$).

Compute the following remainders and dividends (320). For purposes of the following, it is assumed that a divide operation produces a whole integer result, i.e. the fractional portion resulting from the divide operation is discarded:

| | |
|---|---|
| $S_1 = S_0/E_1$ | $R_1 = S_0 \bmod E_1$ |
| $S_2 = S_1/E_2$ | $R_2 = S_1 \bmod E_2$ |
| $S_3 = S_2/E_3$ | $R_3 = S_2 \bmod E_3$ |
| $S_4 = S_3/E_4$ | $R_4 = S_3 \bmod E_4$ |
| $S_5 = S_4/E_5$ | $R_5 = S_4 \bmod E_5$ |
| $S_6 = S_5/E_6$ | $R_6 = S_5 \bmod E_6$ |
| $S_7 = S_6/E_7$ | $R_7 = S_6 \bmod E_7$ |
| | $R_8 = S_7 \bmod E_8$ |

Each of the remainders $R_1$ through $R_8$ represents an instruction at the appropriate level. $R_1$ represents the instruction used for level 1 and $R_8$ represents the instruction used at level 8.

The remainders are next mapped to instructions (330). The mapping from remainder $R_1$ to level 1 instructions (340) is trivial: for level 1 the value of remainder $R_1$ is the opcode number. The value of U is used for all inputs to a level 1 instruction.

The mapping from remainder $R_2$ to level 2 instructions (350) is as follows:

If the remainder $R_2$ is equal to 0 it maps to the sentinel. Otherwise let $Q_2$ equal to $R_2-1$.

If the value of $Q_2$ is less than $2^2 \times 5$ or 20 then use a two input opcode (360).

Divide $Q_2$ by $2^2$ and add 1 (370) (this gives the enumerated value of the opcode to use).

Perform $Q_2$ rem 2 (this gives the value to use as the first input).

Perform $(Q_2/2)$ rem 2 (this gives the value to use as the second input).

For these remainders the value 0 means use U as the input, and the value 1 means use L1 as the input.

Otherwise let $P_2$ equal to $Q_2-2^2\times 5$ and use a one input opcode (360).

Divide $P_2$ by 2 and add 6 (380) (this gives the enumerated value of the opcode to use).

Perform $P_2$ rem 2(this gives the value to use as the input).

The mapping from remainder $R_3$ to level 3 instructions is as follows (390):

If the remainder $R_3$ is equal to 0 it maps to the sentinel.
Otherwise let $Q_3$ equal to $R_3-1$.

If the value of $Q_3$ is less than $3^2\times 5$ or 45, then use a two input opcode (400).

Divide $Q_3$ by $3^2$ and add 1 (420) (this gives the enumerated value of the opcode to use).

Perform $Q_3$ rem 3 (this gives the value to use as the first input).

Perform $(Q_3/3)$ rem 3( this gives the value to use as the second input).

For these remainders the value 0 means use U as the input, the value 1 means use L1 as the input, and the value 2 means use L2 as the input.

Otherwise let $P_3$ equal to $Q_2-3^2\times 5$, and use a one input opcode (400).

Divide $P_3$ by 3 and add 6 (410) (this gives the enumerated value of the opcode to use).

Perform $P_3$ rem 3 (this gives the value to use as the input).

The mapping for levels 4 through 8 is essentially the same as described above for levels 2 and 3. If the sentinel instruction appears as the instruction at any level (430) it marks the end of the ALU instructions (440). No further expansion is necessary. The multiplication result produced is always the result produced by the last instruction in the sequence (440). Thus, for an level 7 sequence the multiplication result is produced by instruction 7 (460). Otherwise, the process continues (450) until the last instruction is encountered. If, after eight instructions have been encountered in this embodiment of the invention, but no sentinel has been encountered, then the sequence is terminated.

The invention provides a faster compile time because no time is spent searching for an efficient sequence of ALU instructions to implement an integer multiplication by a known constant. Rather, the invention allows the compiler to look up the pre-computed solution for a given constant. The invention also provides faster runtime performance because a more efficient sequence of instructions is provided for many of the constants. The invention also makes it possible to use a much more complex searching algorithm to find the short sequence of ALU instructions because it uses a lookup table to store the results from the searching algorithm.

The following provides examples of presently preferred implementations of various multiply operations for the PA-RISC architecture:

The preferred sequence for multiplication by 5 is:
SH2ADD%src,%src,%t1 ; %t1=%src*5
icost=1, dcost=1, count=1
The preferred sequence for multiplication by 6 is:
SH1ADD%src,%src,%t1 ; %t1=%src*3
SHL1%t1,%t2; %t2=%src*6
icost=2, dcost=1, count=1

The preferred sequence for multiplication by 7 is:
SH2ADD%src,%src,%t1 ; %t1=%src*5
SH1ADD%src,%t1,%t2; %t2=%src*7
icost=2, dcost=2, count=5
The preferred sequence for multiplication by 8 is:
SHL3%src,%t1; %t1=%src*8
icost=1, dcost=0, count=1
The preferred sequence for multiplication by 9 is:
SH3ADD%src,%src,%t1 ; %t1=%src*9
icost=1, dcost=1, count=1
The preferred sequence for multiplication by 10 is:
SH2ADD%src,%src,%t1 ; %t1=%src*5
SHL1%t1,%t2; %t2=%src*10
icost=2, dcost=1, count=1
The preferred sequence for multiplication by 11 is:
SH3ADD%src,%src,%t1 ; %t1=%src*9
SH1ADD%src,%t1,%t2; %t2=%src*11
icost=2, dcost=2, count=3
The preferred sequence for multiplication by 12 is:
SH1ADD%src,%src,%t1 ; %t1=%src*3
SHL2%t1,%t2; %t2=%src*12
icost=2, dcost=1, count=1
The preferred sequence for multiplication by 13 is:
SH3ADD%src,%src,%t1 ; %t1=%src*9
SH2ADD%src,%t1,%t2; %t2=%src*13
icost=2, dcost=2, count=3
The preferred sequence for multiplication by 14 is:
SH3ADD%src,%src,%t1 ; %t1=%src*9
SH2ADD%src,%src,%t2; %t2=%src*5
ADD%t1,%t2,%t3; %t3=%src*14
icost=3, dcost=2, count=15
The preferred sequence for multiplication by 15 is:
SH2ADD%src,%src,%t1 ; %t1=%src*5
SH1ADD%t1,%t1,%t2; %t2=%src*15
icost=2, dcost=2, count=3
The preferred sequence for multiplication by 16 is:
SHL4%src,%t1; %t1=%src*16
icost=1, dcost=1, count=1
The preferred sequence for multiplication by 17 is:
SH3ADD%src,%src,%t1 ; %t1=%src*9
SH3ADD%src,%t1,%t2; %t2=%src*17
icost=2, dcost=2, count=7
The preferred sequence for multiplication by 18 is:
SH3ADD%src,%src,%t1 ; %t1=%src*9
SHL1%t1,%t2; %t2=%src*18
icost=2, dcost=1, count=1
The preferred sequence for multiplication by 19 is:
SH3ADD%src,%src,%t1 ; %t1=%src*9
SH1ADD%t1,%src,%t2; %t2=%src*19
icost=2, dcost=2, count=1
The preferred sequence for multiplication by 20 is:
SH2ADD%src,%src,%t1 ; %t1=%src*5
SHL2%t1,%t2; %t2=%src*20
icost=2, dcost=1, count=1
The preferred sequence for multiplication by 21 is:
SH2ADD%src,%src,%t1 ; %t1=%src*5
SH2ADD%t1,%src,%t2; %t2=%src*21
icost=2, dcost=2, count=1
The preferred sequence for multiplication by 123 is:

SHL7%src,%t1; %t1=%src*=b 128
SH2ADD%src,%src,%t2; %t2=%src*5
SUB%t2,%t1,%t3; %t3=%src*123
icost=3, dcost=2, count=1
The preferred sequence for multiplication by 1671 is:
SHL10%src,%t1; %t1=%src*1024
SH3ADD%src,%src,%t2 ; %t2=%src*9
SUB%src,%t1,%t3; %t3=%src*1023
SH3ADD%t2,%t2,%t4; %t4=%src*81
SH3ADD%t4,%t3,%t5; %t5=%src*1671
icost=5, dcost=2, count=1
The preferred sequence for multiplication by 23517 is:
SH3ADD%src,%src,%t1 ; %t1=%src*9
SH3ADD%t1,%t1,%t2; %t2=%src*81
SH3ADD%src,%t1,%t3; %t3=%src*17
SH3ADD%t2,%src,%t4; %t4=%src*649
SH2ADD%t4,%t3,%t5; %t5=%src*2613
SH3ADD%t5,%t5,%t6; %t6=%src*23517
icost=6, dcost=4, count=115
The preferred sequence for multiplication by 2 is:
SHL1%src,%t1; %t1=%src*2
icost=1, dcost=0, count=1
The preferred sequence for multiplication by 3 is:
SH1ADD%src,%src,%t1 ; %t1=%src*3
icost=1, dcost=1, count=1
The preferred sequence for multiplication by 6 is:
SH1ADD%src,%src,%t1 ; %t1=%src*3
SHL1%t1,%t2; %t2=%src*6
icost=2, dcost=1, count=1
The preferred sequence for multiplication by 11 is:
SH3ADD%src,%src,%t1 ; %t1=%src*9
SH1ADD%src,%t1,%t2; %t2=%src*11
icost=2, dcost=2, count=3
The preferred sequence for multiplication by 22 is:
SH3ADD%src,%src,%t1; %t1=%src*9
SH1ADD%src,%t1,%t2; %t2=%src*11
SHL1%t2,%t3; %t3=%src*22
icost=3, dcost=2, count=8
The preferred sequence for multiplication by 43 is:
SH2ADD%src,%src,%t1 ; %t1=%src*5
SH1ADD%src,%src,%t2; %t2=%src*3
SH3ADD%t1,%t2,%t3; %t3 %src*43
icost=3, dcost=2, count=2
The preferred sequence for multiplication by 86 is:
SH3ADD%src,%src,%t1 ; %t1=%src*9
SH2ADD%src,%src,%t2 ; %t2=%src*5
SH3ADD%t1,%t1,%t3; %t3=%src*81
ADD%t2,%t3,%t4; %t4=%src*86
icost=4, dcost=2, count=8
The preferred sequence for multiplication by 171 is:
SH3ADD%src,%src,%t1 ; %t1=%src*9
SH3ADD%t1,%t1,%t2; %t2=%src*81
SH1ADD%t2,%t1,%t3; %t3=%src*171
icost=3, dcost=3, count=2
The preferred sequence for multiplication by 173 is:
SH2ADD%src,%src,%t1; %t1=%src*5
SH2ADD%t1,%src,%t2; %t2=%src*21
SH3ADD%t2,%t1,%t3; %t3=%src*173 icost=3, dcost=3, count=1
The preferred sequence for multiplication by 342 is:
SH3ADD%src,%src,%t1 ; %t1=%src*9
SH3ADD%t1,%t1,%t2; %t2=%src*81
SH1ADD%t2,%t1,%t3; %t3=%src*171
SHL1%t3,%t4; %t4=%src*342
icost=4, dcost=3, count=11
The preferred sequence for multiplication by 346 is:
SH3ADD%src,%src,%t1 ; %t1=%src*9
SHL8%src,%t2; %t2=%src*256
SH2ADD%t1,%t1,%t3; %t3=%src*45
SH1ADD%t3,%t2,%t4; %t4=%src*346
icost=4, dcost=3, count=8
The preferred sequence for multiplication by 683 is:
SH3ADD%src,%src,%t1 ; %t1=%src*9
SH3ADD%src,%t1,%t2; %t2=%src*17
SH3ADD%t1,%t1,%t3; %t3=%src*81
SH1ADD%t1,%t2,%t4; %t4=%src*35
SH3ADD%t3,%t4,%t5; %t5=%src*683
icost=5, dcost=3, count=158
The preferred sequence for multiplication by 1867 is:
SHL6%src,%t1; %t1=%src*64
SUB%t1,%src,%t2; %t2=%src*-63
SH2ADD%t1,%src,%t3; %t3=%src*257
SH1ADD%t2,%t2,%t4; %t4=%src*-189
SH3ADD%t3,%t4,%t5; %t5=%src*1867
icost=5, dcost=3, count=1
The preferred sequence for multiplication by 1366 is:
SH3ADD%src,%src,%t1 ; %t1=%src*9
SHL10%src,%t2; %t2=%src*1024
SH3ADD%t1,%t1,%t3; %t3=%src*81
SH1ADD%t1,%t2,%t4; %t4=%src*1042
SH2ADD%t3,%t4,%t5; %t5=%src*1366
icost=5, dcost=3, count=17
The preferred sequence for multiplication by 3734 is:
SH3ADD%src,%src,%t1 ; %t1=%src*9
SH1ADD%src,%t1,%t2; %t2=%src*11
SH1ADD%t1,%t2,%t3; %t3=%src*29
SHL7%t3,%t4; %t4=%src*3712
SH1ADD%t2,%t4,%t5; %t5=%src*3734
icost=5, dcost=5, count=5
The preferred sequence for multiplication by 2731 is:
SH2ADD%src,%src,%t1 ; %t1=%src*5
SHL6%t1,%t2; %t2=%src*320
SH1ADD%t1,%src,%t3; %t3=%src*11
SH2ADD%t1,%t2,%t4; %t4 %src*340
SH3ADD%t4,%t3,%t5; %t5=%src*2731
icost=5, dcost=3, count=2
The preferred sequence for multiplication by 10452 is:
SHL6%src,%t1; %t1=%src*64
SH3ADD%t1,%src,%t2; %t2=%src*513
SH1ADD%t1,%t1,%t3; %t3=%src*192
SH2ADD%t2,%t2,%t4; %t4=%src*2565
SH2ADD%t4,%t3,%t5; %t5=%src*10452
icost=5, dcost=3, count=1
The preferred sequence for multiplication by 5462 is:
SH2ADD%src,%src,%t1 ; %t1=%src*5
SH2ADD%t1,%src,%t2; %t2=%src*21

SHL8%t2,%t3; %t3=%src*5376
SH1ADD%t2,%src,%t4; %t4=%src*43
SH1ADD%t4,%t3,%t5; %t5=%src*5462
icost=5, dcost=4, count=12
The preferred sequence for multiplication by 59 is:
SHL6%src,%t1; %t1=%src*64
SH2ADD%src,%src,%t2; %t2=%src*5
SUB%t2,%t1,%t3; %t3=%src*59

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

I claim:

1. A method for implementing multiply operations in a compiler, comprising the steps of:

providing a look-up table associated with said compiler that contains sequences of instructions for effecting said multiply operations;

providing an input value to said compiler;

using said input value as an index into said look-up table;

extracting an integer from said look-up table at a table location indexed by said input value;

converting said extracted integer into said sequence of instructions;

executing said sequence of instructions with said compiler to perform said multiply operation on said input value; and providing an output value resulting from said multiply operation.

2. The method of claim 1, further comprising the step of:

providing a sentinel instruction in said sequence of instructions that indicates an end of said sequence of instructions.

3. The method of claim 2, further comprising the step of:

providing as said output value a result from a last instruction that is executed before encountering said sentinel instruction.

4. An apparatus for implementing multiply operations in a compiler, comprising:

a look-up table associated with said compiler that contains sequences of instructions for effecting said multiply operations;

means for indexing said look-up table with an input value provided to said compiler;

means for extracting an integer from said look-up table at a table location indexed by said input value; and means for converting said extracted integer into said sequence of instructions;

wherein said compiler executes said sequence of instructions to perform said multiply operation on said input value and provide an output value resulting therefrom.

5. The apparatus of claim 4, further comprising:

a sentinel instruction in said sequence of instructions that indicates an end of said sequence of instructions.

6. The apparatus of claim 5, wherein said compiler provides as said output value a result from a last instruction that is executed before encountering said sentinel instruction.

7. A method for implementing multiply operations in a compiler, comprising the steps of:

enumerating each ALU opcode that is useful on a given architecture for computing a multiply operation result;

encoding said ALU instructions at every level into a look-up table where a first instruction of said instruction sequence is a level 1 instruction, an Nth instruction of said instruction sequence is a level N instruction, a one instruction sequence is a level 1 instruction sequence, and an N instruction sequence is a level N instruction sequence;

producing an integer representative of each sequence of ALU instructions once all possible encoding are known;

using said compiler to index said look-up table with an input value;

expanding said encoded ALU instructions at an indexed look-up table location into a corresponding sequence of ALU instructions;

executing said corresponding sequence of ALU instructions with said compiler to perform said multiply operation on said input value; and providing an output value resulting from said multiply operation.

8. The method of claim 7, further comprising the steps of:

dividing said opcodes into those that accept two inputs and produce one output, and those that accept one input and produce one output;

reserving one of said opcodes as a sentinel to mark an end of a sequence of ALU instructions;

recording a range of opcodes that have two inputs and one output; and enumerating said range of opcodes that have two inputs and one output.

9. The method of claim 8, said encoding step further comprising the step of:

taking a square of said level;

multiplying a value thus obtained by the number of opcodes that have two inputs;

adding the number of instructions that have one input to this value; and adding one to a total to define said end of sequence sentinel.

10. An apparatus for implementing multiply operations in a compiler comprising:

means for enumerating each ALU opcode that is useful on a given architecture for computing a multiply operation result;

a look-up table into which said ALU instructions at every level are encoded, where a first instruction of said instruction sequence is a level 1 instruction, an Nth instruction of said instruction sequence is a level N instruction, a one instruction sequence is a level 1 instruction sequence, and an N instruction sequence is a level N instruction sequence:

means for producing an integer representative of each sequence of ALU instructions once all possible encoding are known;

an input value that is used by said compiler to index said look-up table;

means for expanding said encoded ALU instructions at an indexed look-up table location into a corresponding sequence of ALU instructions;

wherein said compiler executes said corresponding sequence of ALU instructions to perform said multiply operation on said input value and provide an output value resulting therefrom.

11. The apparatus of claim 10, wherein said opcodes are divided into those that accept two inputs and produce one output, and those that accept one input and produce one output;

one of said opcodes is reserved as a sentinel to mark an end of a sequence of ALU instructions;

a range of opcodes that have two inputs and one output is recorded; and said range of opcodes that have two inputs and one output is enumerated.

12. The apparatus of claim 11, wherein said ALU opcodes are encoded by:

taking a square of said level;

multiplying a value thus obtained by the number of opcodes that have two inputs;

adding the number of instructions that have one input to this value; and adding one to a total to define said end of sequence sentinel.

13. A method for reducing an integer into a sequence of ALU instructions, comprising the steps of:

using an input value U to call an integer $S_0$ which represents a sequence of ALU instructions that performs integer multiplication of said input value by a constant value X;

computing a level table containing values for ALU instruction encodings at each level, where a first instruction of said ALU instruction sequence is a level 1 instruction, an Nth instruction of said ALU instruction sequence is a level N instruction, a one instruction sequence is a level 1 instruction sequence, and an N instruction sequence is a level N instruction sequence;

computing remainders and dividends where each of said remainders represents an ALU instruction; and mapping said remainders to said ALU instructions; and executing said sequence of ALU instructions to produce a multiplication result.

14. The method of claim 13 further comprising the step of:

mapping from a first remainder $R_1$ to level 1 instructions where the value of said first remainder $R_1$ is an opcode number, and where the value of U is used for all inputs to a level 1 instruction.

15. The method of claim 13, further comprising the steps of:

mapping from a second remainder $R_2$ to level 2 instructions as follow:

if the second remainder $R_2$ is equal to 0, then mapping to a sentinel to mark an end of a sequence of ALU instructions;

otherwise let $Q_2$ equal $R_2-1$;

if the value of $Q_2$ is less than $2^2 \times 5$ then using a two input opcode;

dividing $Q_2$ by $2^2$ and adding 1 to produce an enumerated value of a corresponding ALU opcode;

performing $Q_2$ rem 2 to yield a value to use as a first input; and performing $(Q_2/2)$ rem 2 to yield a value to use as a second input;

using U as an input if the value for said remainder is a first value; and using L1 as an input if the value for said remainder is a second value; otherwise let $P_2$ equal to $Q_2-2^2 \times 5$ and use a one input opcode (360);

dividing $P_2$ by 2 and adding 6 to produce an enumerated value of a corresponding opcode; and performing $P_2$ rem 2 to yield a value to use as said input.

16. The method of claim 13, further comprising the steps of:

mapping from a remainder $R_N$ to level N instructions as follows:

if said remainder $R_N$ is equal to 0, then mapping to a sentinel to mark an end of a sequence of ALU instructions;

otherwise let $Q_N$ equal to $R_n-1$;

if the value of $Q_N$ is less than $N^2 \times Y$, then using a two input opcode;

dividing $Q_N$ by $N^2$ and adding 1 to produce an enumerated value of said opcode;

performing $Q_N$ rem N to yield a value to use as a first input;

performing $(Q_N/N)$ rem N to yield a value to use as a second input;

using U as an input if the value for said remainder is a first value; and using L1 as an input if the value for said remainder is a second value;

otherwise let $P_N$ equal to $Q_{N-1}-N^2 \times Y$, then using a one input opcode; dividing $P_N$ by N and adding 6 to produce an enumerated value of said opcode; and performing $P_N$ rem N to yield a value to use as an input.

17. An apparatus for reducing an integer into a sequence of ALU instructions, comprising:

a level table containing values for ALU instruction encodings at each level, where a first instruction of said ALU instruction sequence is a level 1 instruction, an Nth instruction of said ALU instruction sequence is a level N instruction, a one instruction sequence is a level 1 instruction sequence, and an N instruction sequence is a level N instruction sequence;

means for using an input value U to call an integer $S_0$ which represents a sequence of ALU instructions that performs integer multiplication of said input value by a constant value X;

means for computing remainders and dividends where each of said remainders represents an ALU instruction; and means for mapping said remainders to said ALU instructions; and means for executing said sequence of ALU instructions to produce a multiplication result.

18. The apparatus of claim 17, further comprising:

means for mapping from a first remainder $R_1$ to level 1 instructions where the value of said first remainder $R_1$ is an opcode number, and where the value of U is used for all inputs to a level 1 instruction.

19. The apparatus of claim 17, further comprising:

means for mapping from a second remainder $R_2$ to level 2 instructions as follows:

if the second remainder $R_2$ is equal to 0, then mapping to a sentinel to mark an end of a sequence of ALU instructions;

otherwise let $Q_2$ equal $R_2-1$;

if the value of $Q_2$ is less than $2^2 \times 5$ then using a two input opcode;

dividing $Q_2$ by $2^2$ and adding 1 to produce an enumerated value of a corresponding ALU opcode;

performing $Q_2$ rem 2 to yield a value to use as a first input; and performing $(Q_2/2)$ rem 2 to yield a value to use as a second input;

using U as an input if the value for said remainder is a first value; and using L1 as an input if the value for said remainder is a second value;

otherwise let $P_2$ equal to $Q_2-22\times 5$ and use a one input opcode (360);

dividing $P_2$ by 2 and adding 6 to produce an enumerated value of a corresponding opcode; and performing $P_2$ rem 2 to yield a value to use as said input.

20. The apparatus of claim 17, further comprising:

means for mapping from a remainder $R_N$ to level N instructions as follows:

if said remainder $R_N$ is equal to 0, then mapping to a sentinel to mark an end of a sequence of ALU instructions;

otherwise let $Q_N$ equal to $R_n-1$;

if the value of $Q_N$ is less than $N^2\times Y$, then using a two input opcode;

dividing $Q_N$ by $N^2$ and adding 1 to produce an enumerated value of said opcode;

performing $Q_N$ rem N to yield a value to use as a first input;

performing $(Q_N/N)$ rem N to yield a value to use as a second input;

using U as an input if the value for said remainder is a first value; and using L1 as an input if the value for said remainder is a second value;

otherwise let $P_N$ equal to $Q_{N-1}-N^2\times Y$, then using a one input opcode;

dividing $P_N$ by N and adding 6 to produce an enumerated value of said opcode; and performing $P_N$ rem N to yield a value to use as an input.

\* \* \* \* \*

UNITED STATES PATENT AND TRADEMARK OFFICE
CERTIFICATE OF CORRECTION

PATENT NO. : 5,764,990
DATED : June 9, 1998
INVENTOR(S) : Brian Sullivan

It is certified that error appears in the above-identified patent and that said Letters Patent is hereby corrected as shown below:

Column 12,
Line 51, delete "sequence:" and insert therefore -- sequence; --

Column 15,
Line 3, delete "$Q_2$-22x5" and insert therefore -- $Q_2$-$2^2$x5 --

Signed and Sealed this

Eleventh Day of May, 2004

JON W. DUDAS
*Acting Director of the United States Patent and Trademark Office*